No. 77,298.

J. W. MAHLON.
GAS METER.

PATENTED APR. 28, 1868.

2 SHEETS—SHEET 1.

Witnesses:
J. M. Coombs
Edwd. P. Tracy

Inventor.
J. W. Mahlon
Per Brown Coombs
Atty

No. 77,298.  
J. W. MAHLON.  
GAS METER.
PATENTED APR. 28, 1868.

2 SHEETS—SHEET 2.

Witnesses:  
J. W. Coombs  
Edw. P. Tracy

Inventor  
J. W. Mahlon  
per Crowncombs &c  
Atty

United States Patent Office.

JAMES W. MAHLON, OF BROOKLYN, NEW YORK.

Letters Patent No. 77,298, dated April 28, 1868.

IMPROVEMENT IN GAS-METERS.

*The Schedule referred to in these Letters Patent and making part of the same.*

TO ALL WHOM IT MAY CONCERN:

Be it known that I, JAMES W. MAHLON, of Brooklyn, in the county of Kings, and State of New York, have invented a new and useful Improvement in Gas-Meters, of which the following is a full, clear, and exact description, reference being had to the accompanying drawing, forming part of this specification, and in which—

Figure 1:
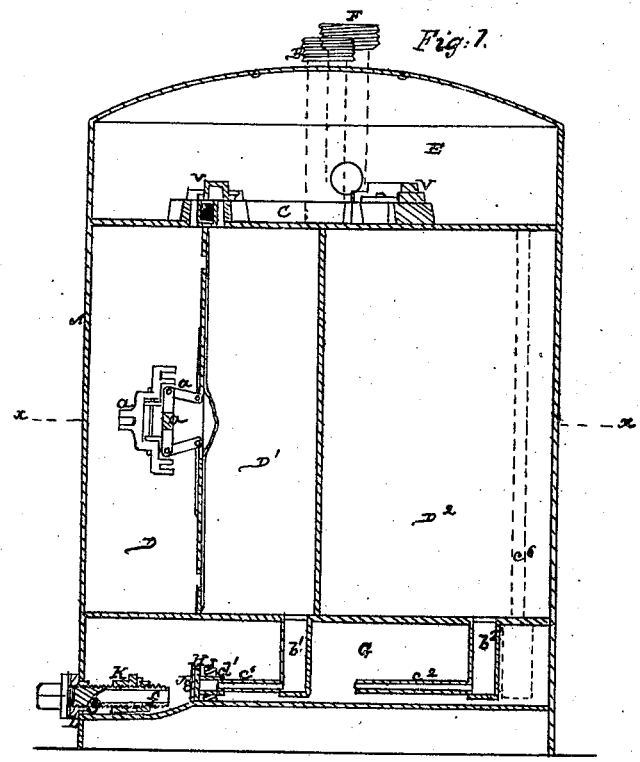

Figure 1 represents a vertical section of a gas-meter in part, with my improvement applied to it.

Figure 2:
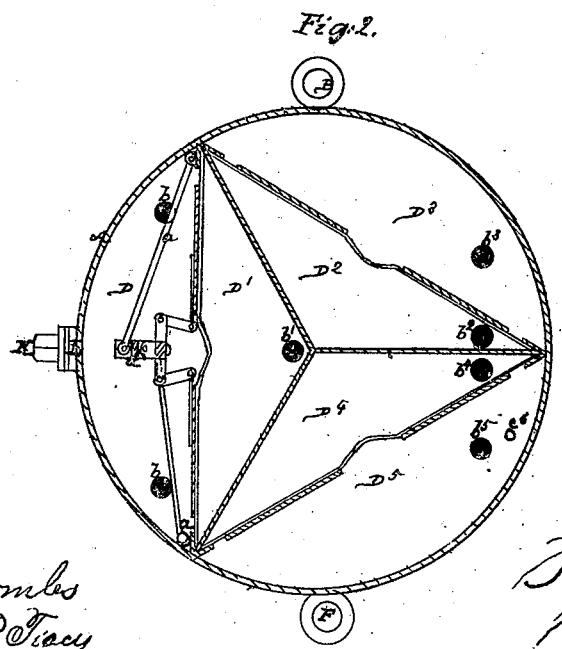
Figure 3:
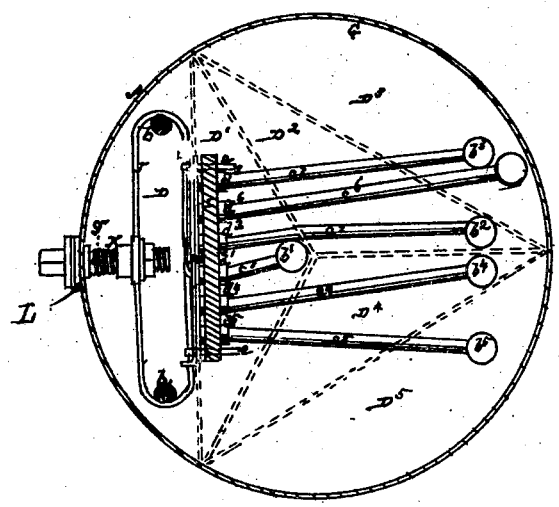

Figure 2, a transverse section of the same, taken as denoted by the line $x\ x$ in fig. 1; and Figure 3 a sectional inverted plan through the lower portion of the meter, in illustration of certain devices for drawing off the water.

Similar letters of reference indicate corresponding parts throughout the several figures.

While the collection of water in gas-meters of the dry kind or order is a common cause of annoyance and complaint, not only producing flickering of the gas, putting it out by stoppage of the flow of gas, but interfering generally with the proper working of the meter, there has heretofore been no provision for drawing off water from the body of the meter otherwise than by disconnecting the meter from its pipe-attachments, and inverting and shaking it, so as to run off the water through the usual outlet-pipe of the meter. This is a tedious and inconvenient arrangement, but the taps or screw-plug caps, heretofore provided on the inlet and outlet-pipes, have only served to draw off the water collecting in said pipes, and in no way to relieve the measuring or working-chambers of the meter, that in course of time become so choked with water as materially to interfere with the working of the bellows-like diaphragms, and altogether stopping the action of the meter. The extension of the inlet and outlet-pipes, too, down and outside of the meter, to form reservoirs for collection of the water, is also an objectionable feature, and in this connection more especially so, providing the inlet-pipe with a screw-plug cap, covering a water-escape, as such outlet affords a ready means for establishing a connecting-pipe to draw off gas, that is thus consumed without passing through the meter.

My invention obviates these defects, and by it a ready means is provided for drawing off water that may collect, by sweating or otherwise, in the meter, including the measuring or working-chambers, or bellows-portion of the apparatus, said invention consisting in a combination with the measuring or working-chambers, and it may be, chamber supplied therefrom, of separate escapes or outlets in communication with a lower water-receiving chamber, and under the control of a valve or valves, capable of operation from the exterior in such manner as that while gas is prevented passing from one working-chamber to another of the meter, to interfere with the working of the latter, the water may be run off or discharged from each of them, and the body of the meter generally, including (say) indirectly the inlet and outlet-pipes, be emptied of water without taking down or disturbing the meter, or without, it may be, (and still the working of the meter not be materially interfered with,) even shutting off the gas. And said invention further embraces a peculiar construction of devices for accomplishing these ends, including a valvular device common to all or most of the water-escapes, and hollow discharge-screw or plug, that, as it is worked in or out, serves, through a perforation made in its periphery, to establish communication with the interior or exterior of the meter, accordingly as it is required to close the water-escapes to the several chambers, or to establish a free vent for the water to run off from them and the meter generally. The invention also includes a peculiar elastic construction of the valvular cover or device to the water-escapes, whereby it is made more or less automatic in closing, and secure when closed.

Referring to the accompanying drawing, A represents the outer shell or case of the meter. B, the inlet-pipe, arranged as usual, to communicate with a distributing-channel or covered way, C, from and through which the gas is passed, by or through valves, V, working over suitable ports or ways, into the measuring or working-chambers, D D¹ D² D³ D⁴ D⁵, and out again thereof into the gas-supply chamber, E, in such manner or order as to cause the diaphragms to be worked to and fro, and by their action to operate, through the agency of ordinary or other suitable mechanism, $a\ a\ a$, and the usual or any proper mechanical devices connected therewith, the valves V and indicator of the meter, all as well understood by those acquainted with the construction of gas-meters. Of course the number of measuring or working-chambers may be varied.

F is the outlet-pipe from the gas-supply chamber E of the meter. Neither this pipe F nor the inlet-pipe B may be extended down the meter further than to establish their proper connection, the one with the chamber E, and the other with the covered way C; nor is it necessary that either pipe should be provided with capped or other outlets for drawing off the water collecting in them, as other means, as hereinafter described, are provided for relieving them in connection with the body generally of the meter, and thus the usual facility for establishing a surreptitious or irregular connection with the meter by branch from the inlet-pipe at the water-escape outlet is avoided.

The means for drawing off the water may be substantially as follows: G is a chamber or lower compartment, arranged below the measuring or working-chambers, D $D^1$ $D^2$ $D^3$ $D^4$ $D^5$, of the meter, and in communication therewith by water-escape outlets, $b$ $b^1$ $b^2$ $b^3$ $b^4$ $b^5$. The one of these measuring-chambers may be in constantly open connection, by its outlet or outlets $b$, with the lower compartment G, while the other measuring or working-chambers have their outlets $b^1$ $b^2$ $b^3$ $b^4$ $b^5$ extended, and connected by pipes $c^1$ $c^2$ $c^3$ $c^4$ $c^5$ with nozzles $d^1$ $d^2$ $d^3$ $d^4$ $d^5$, that have their mouths or openings controlled so as to open or close them by a valve or valves operated from the exterior, and which valvular device may be a single rubber or other suitably-faced strip or plate, H, arranged to slide to and from the nozzles $d^1$ $d^2$ $d^3$ $d^4$ $d^5$, and guided in such action by pins or rods, $e$, that fit through a fixed strip, I, in which the nozzles are secured. The gas-supply chamber E may be similarly provided with a water-escape outlet-pipe, $c^6$, and nozzle, $d^6$, controlled too, say, by the valve or valvular device H, or its equivalent.

From this description it will be seen that when the several nozzles, $d^1$ $d^2$ $d^3$ $d^4$ $d^5$ $d^6$, are closed by the valve H, the gas is prevented passing from one chamber to the other, and so restrained from interfering with the regular working of the meter, but that when said nozzles, by the action of the valve, are put in like open communication with the chamber G, as is established for the one measuring-chamber by its outlet or outlets $b$, then the several measuring or working-chambers, D $D^1$ $D^2$ $D^3$ $D^4$ $D^5$, and supply-chamber E, together with the inlet and outlet-pipes B F, are in open connection with the chamber or compartment G, which, by its lower level, thus serves to receive water, produced by sweating or otherwise, that may have formed or collected, not simply in the pipes B F, but in or throughout the several chambers (measuring and supply) that constitute or compose the body generally of the meter. By this means or in this manner may the whole meter be cleared of water.

To discharge the water thus collected in the chamber G, and to work the valve H, so as to open or close it as required, said valve H may be attached by a spring-like connection, J, to a hollow screw, K, that works through a box, L, in the case of the meter, said hollow screw having its longitudinal passage, $f$, that is open at its inner extremity, terminate in a side orifice, $g$, which is intermediate of the length of the screw, so that, on working the screw K home, not only is the valve H closed against the several nozzles, $d^1$ $d^2$ $d^3$ $d^4$ $d^5$ $d^6$, but the orifice, $g$, of the screw located inside the chamber G of the meter, while, on working the screw K sufficiently outwards, the nozzles are uncovered, or valve H opened, and the orifice $g$ arranged on the outside of the meter to permit of the water collecting in the chamber G being discharged through the screw.

Thus may the meter, throughout its entire body, be tapped of water with the greatest facility, from time to time, without taking down the same, or, it may be, even shutting off the gas.

Of course, the means for opening or closing communication, substantially as described, between the several working-chambers of the meter and lower water-discharge compartment or passage may be greatly varied, as also the water-discharge contrivance be changed, but the combination of devices here shown is found to answer well, and possesses certain advantages, as, for instance, the spring-like connection of the valve with the screw gives an automatic closing of the valve in advance of the screw being fully worked home, which secures the nozzles being shut, and makes a close fit of the valve, as also prevents it being accidentally opened by a slight turning of the screw. The hollow and side-perforated screw, too, effectually prevents leakage of the gas, and only establishes open communication with the exterior after and whilst the valve is open, the said screw, too, being preferably located in a sunken portion or channel-way within the chamber G, so as to catch and discharge all water, however little, that may pass into or collect in said lower chamber. If preferred, a plain but similarly hollowed and perforated sliding plug or rod, working through a stuffing-box, might be substituted for the screw, and the same be drawn inwards by a spring, together with the valve or valves, so that it would only be necessary to draw out the plug or rod to open the nozzles and effect the discharge, and so that on releasing hold on said rod, it and the valve or valves will be automatically closed against establishing discharge or escape.

What is here claimed, and desired to be secured by Letters Patent, is—

1. The combination, with the measuring or working-chambers, of separate water-escapes or outlets and lower receiving-chamber or compartment, with valve or valves for operation in such manner as that the several chambers, making up the body of the meter, may be relieved of water collecting in them, without disturbance or removal of the meter, and, when the valves are closed, without establishing communication between the several chambers to interfere with the operation of the meter, substantially as specified.

2. The combination, with the supply-chamber, to which gas is admitted from the measuring-compartment, of a water-escape pipe or outlet, lower water-receiving chamber and valve, controlling said outlet within the latter compartment, essentially as herein set forth, and whereby a single water-escape may serve to relieve both the supply-chamber and inlet and outlet-pipes; also, whereby the meter is better protected against being tapped of gas drawn from the inlet-pipe, as specified.

3. In combination with the several nozzles or outlets to the water-escape pipes, or their equivalents, from the several gas-chambers that compose, or mainly so, the body of the meter, a valve or valvular device, arranged to simultaneously control said outlets, essentially as described.

4. The hollow and perforated water-discharging screw, or its equivalent, in combination with the valve or valvular device that controls the water-nozzles or outlets to the several gas-chambers, or certain of them, of the meter, substantially as specified.

5. The combination, with the water-charging screw, or its equivalent, and valve or valvular device, controlling the outlets from the several chambers of the meter, of an elastic or spring-like connection interposed between said screw and valve, essentially as herein set forth.

JAMES W. MAHLON.

Witnesses:
    EDWD. P. TRACY,
    J. W. COOMBS.